United States Patent [19]
Noda

[11] Patent Number: 6,014,262
[45] Date of Patent: Jan. 11, 2000

[54] COLLIMATOR LENS AND OPTICAL SCANNER DEVICE WHICH USES SUCH COLLIMATOR LENS

[75] Inventor: Takayuki Noda, Urawa, Japan

[73] Assignee: Fuji Photo Optical Co., Ltd., Omiya, Japan

[21] Appl. No.: 09/206,558

[22] Filed: Dec. 8, 1998

[51] Int. Cl.[7] .......................... G02B 27/30; G02B 26/08; G02B 21/02; G02B 9/00
[52] U.S. Cl. ........................ 359/641; 359/205; 359/659; 359/662; 359/739; 359/763; 359/770
[58] Field of Search .................... 359/205, 641, 359/659, 662, 714, 739, 753, 763, 770

[56] References Cited

U.S. PATENT DOCUMENTS

| | | | |
|---|---|---|---|
| 2,855,824 | 10/1958 | Schade | 359/739 |
| 3,039,360 | 6/1962 | Hopkins | 359/739 |
| 3,784,286 | 1/1974 | Dudragne | 359/753 |
| 4,400,063 | 8/1983 | Hayashida | 359/662 |
| 4,880,299 | 11/1989 | Hamada | 359/662 |
| 4,917,483 | 4/1990 | Nakao | 359/662 |
| 5,055,663 | 10/1991 | Morimoto et al. | 359/662 |
| 5,087,987 | 2/1992 | Simbal | 359/770 |
| 5,111,325 | 5/1992 | DeJager | 359/662 |
| 5,386,312 | 1/1995 | Spencer | 359/641 |
| 5,404,247 | 4/1995 | Cobb et al. | 359/662 |
| 5,587,837 | 12/1996 | Kebo | 359/770 |
| 5,608,564 | 3/1997 | Schick | 359/205 |

FOREIGN PATENT DOCUMENTS

| | | |
|---|---|---|
| 8-114767 | 5/1996 | Japan . |
| 8-114768 | 5/1996 | Japan . |

*Primary Examiner*—David Nelms
*Assistant Examiner*—Evelyn A. Lester
*Attorney, Agent, or Firm*—Arnold International; Bruce Y. Arnold

[57] ABSTRACT

A collimator lens having five lens elements of negative, negative, positive, positive, and negative refractive power, in order from a collimated luminous flux side of the collimator lens, and designed to have a large back focus, to thereby prevent heat from the light source from causing aberrations in the collimator lens. The collimator lens includes a negative first lens element $L_1$ of a meniscus shape with its concave surface on the collimated luminous flux side, a positive fourth lens element $L_4$ with a convex surface on the collimated luminous flux side, and a negative fifth lens element $L_5$ with a concave surface on the collimated luminous flux side. In addition, a diaphragm stop is arranged on the collimated luminous flux side of the first lens element, and certain conditions are satisfied to reduce aberrations and provide a large back focus.

20 Claims, 5 Drawing Sheets

COLLIMATOR LENS AND OPTICAL SCANNER DEVICE WHICH USES SUCH COLLIMATOR LENS

BACKGROUND OF THE INVENTION

Heretofore, various optical scanning devices such as laser printers and copying machines for displaying and recording an image by scanning with a laser beam have been known. This type of optical scanning device is made so that a laser beam from a laser diode is collimated by a collimator lens, is scanned by being reflected off a rotating polygon mirror, and is then stopped down by an f-θ lens and is made incident onto a photoconductive surface of a photosensitive drum. In this manner, the scanning of a small spot of light onto a recording medium is achieved.

However, with this type of optical scanning device it becomes necessary to employ an overall lens system having a high numerical aperture in order to achieve a sufficiently high luminance on the photosensitive drum. Further, the numerical aperture of the collimator lens is large compared to that of a general f-θ lens, thereby making the aberrations caused by the collimator lens more troublesome. Therefore, it becomes essential to constrain the optical aberrations in the collimator lens in order to make the spot on the photosensitive drum as small as desired.

A collimator lens as described above is disclosed, for example, in Japanese Laid-Open Patent Application H08-114768. However, when the collimator lens is placed in proximity to a light source (such as a laser diode), the temperature of the disclosed collimator lens increases due to the heat from the light source. Hence there is a problem in that the heating of the collimator lens causes the optical aberrations to increase. Therefore, it becomes essential to increase the back focal distance of the collimator lens so that the distance between the collimator lens and the light source is larger in order to thermally isolate the collimator lens from the heat of the light source. Such a collimator lens, having a three lens composition, is disclosed in, for example, Japanese Laid-Open Patent Application H08-114767. However, with the collimator lens described therein, there is a problem in that the optical aberrations increase when the light source (such as a laser diode) or the collimator lens experiences mis-positioning in a direction parallel to the optical axis (hereinafter termed slippage). Further, when either the light source or the collimator lens experiences mis-positioning normal to the optical axis (hereinafter termed de-centering), there is the problem that the position of light formation on the photosensitive drum changes.

BRIEF SUMMARY OF THE INVENTION

A first object of the present invention is to provide a collimator lens, for use in an optical scanning device, which has a low f-number (i.e., high numerical aperture) so as to provide a bright image. A second object of the invention is to provide a collimator lens which has small aberrations as well as small curvature of field. A third object of the invention is to provide a collimator lens having a large back focus which allows the distance between the collimator lens and the light source to be increased in order to thermally isolate the collimator lens from the heat of the light source, thereby maintaining low aberrations when the collimator lens is in use.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 1:
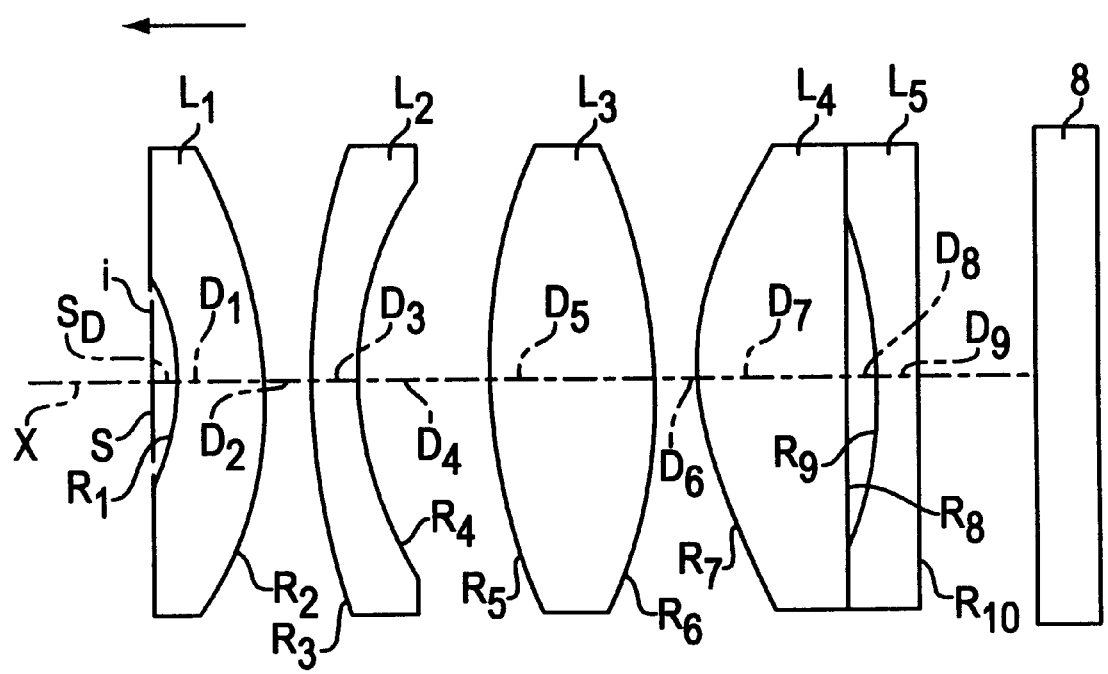
FIG. 1 shows the basic structure of a collimator lens which relates to Embodiments 1 through 5 of the present invention.

The present invention relates to a collimator lens, for use in an optical scanning device such as a laser printer or copying machine, which displays and records an image by scanning with a laser beam. More particularly, it relates to a collimator lens for converting a divergent luminous flux emitted from a light source such as a laser diode into a collimated (i.e., parallel) luminous flux.

The collimator lens of the present invention includes, in order from the collimated luminous flux side of the collimator lens: a first lens element having negative refractive power formed by a meniscus lens element with its concave surface on the side of the collimated luminous flux, a second lens element having negative refractive power, a third lens element having positive refractive power, a fourth lens element having positive refractive power with a convex surface on the side of the collimated luminous flux, and a fifth lens element having negative refractive power with a concave surface on the side of the collimated luminous flux. Further, there is a diaphragm arranged on the collimated luminous flux side of the first lens element.

It is preferred that the following condition be satisfied:

$$0.90 < f_{345}/f < 0.95 \qquad \text{Condition (1)}$$

where $f_{345}$ is the composite focal length of the third lens element through the fifth lens element, and f is the focal length of collimator lens.

Further it is also preferable that the following conditions be satisfied:

$$-0.79 < R_1/f < -0.70 \qquad \text{Condition (2)}$$

$$1.10 < f_4/f < 1.94 \qquad \text{Condition (3)}$$

where, $R_1$ is the radius of curvature of the lens surface on the collimated luminous flux side of the first lens element, $f_4$ is the focal length of the fourth lens element, and f is as defined above.

Further, an improved optical scanning device that relates to the present invention employs the collimator lens described above.

Condition (1) regulates the ratio of the focal length f of the collimator lens to the composite focal length $f_{345}$ of the third through fifth lens elements. When the value of $f_{345}/f$ is greater than the upper limit, the generated amount of spherical aberration occurring in the lens elements having positive refractive power, i.e. the third lens element and the fourth lens element, becomes too great and the correction of spherical aberration becomes very difficult. On the other hand, when the value of $f_{345}/f$ is less than the lower limit, the back focus becomes too small. In other words, by satisfying Condition (1), the spherical aberration can be favorably corrected while making it possible to obtain a long back focus which enables the collimator lens to be thermally isolated from the light source.

Condition (2) regulates the ratio of the composite focal length f of the collimator lens to the radius of curvature $R_1$ of the lens surface on the collimated luminous flux side of the first lens element. According to Condition (2), when the value of $R_1/f$ is greater than the upper limit, the generated amount of curvature of field increases. On the other hand, according to Condition (2), if the value of $R_1/f$ is less than the lower limit, then correction of spherical aberration becomes impossible while maintaining sufficient back focus. In other words, by satisfying Condition (2), the spherical aberration can be favorably corrected while constraining the occurrence of curvature of field.

Condition (3) regulates the ratio of the focal length f of the collimator lens to the focal length $f_4$ of the fourth lens element. When the value of $f_4/f$ is greater than the upper limit, the generated amount of positive spherical aberration of the fourth lens element becomes too great making it very difficult to correct for spherical aberration. On the other hand, if the value of $f_4/f$ is less than the lower limit, then the focal length of the fourth lens element becomes too small, making the generated negative spherical aberration too small. In other words, by satisfying Condition (3), the spherical aberration and coma can be favorably corrected.

Moreover, according to the standard convention, the radius of curvature R of a lens element surface is indicated as being positive if the center of curvature lies to the right of the lens element surface.

FIG. 1 shows the basic construction of the collimator lens that relates to each embodiment of the present invention.

Figure 2:
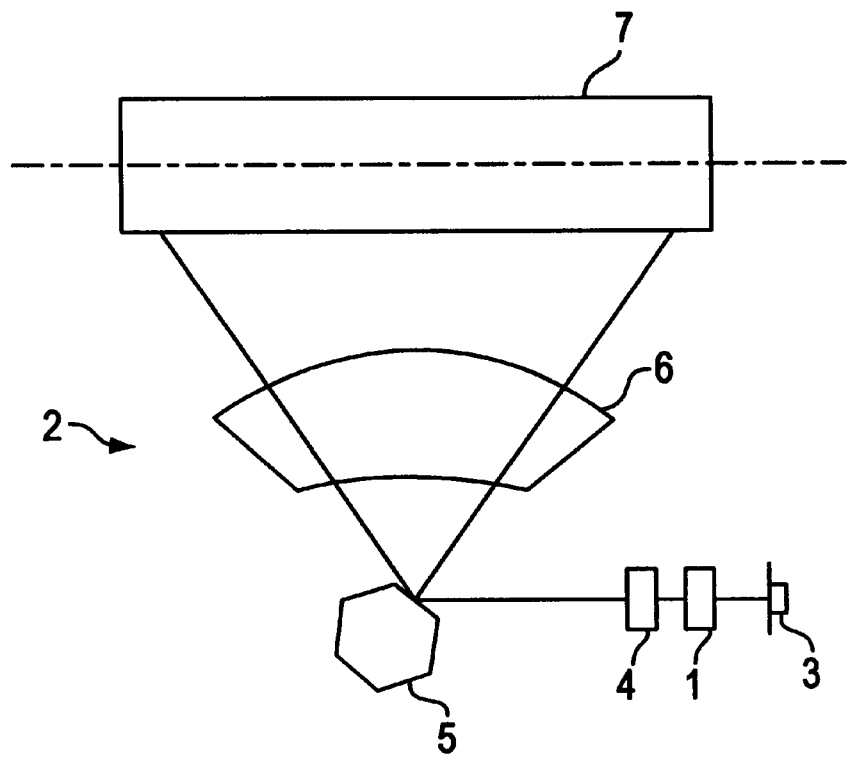
FIG. 2 illustrates an optical scanning device that uses the collimator lens of the present invention.

FIG. 2 illustrates an improved optical scanning device 2 that uses the collimator lens shown in FIG. 1. The optical scanning device 2 (such as a laser printer, scanner, copy machine, etc., for recording and displaying an image by scanning with a laser beam), in addition to converting the light irradiated from laser diode 3 into a collimated luminous flux using collimator lens 1, corrects for surface tilt of polygon mirror 5. This is accomplished by using a supplemental optical system 4 comprised of, for example, a slit and cylindrical lens. Thus, the scanning device 2 scans a small beam spot onto a recording medium. The beam spot is formed by directing a laser beam, which has been reflected by the polygon mirror 5, onto the surface of a photoconductive photosensitive drum 7 by way of the f-θ lens 6.

Figure 3:
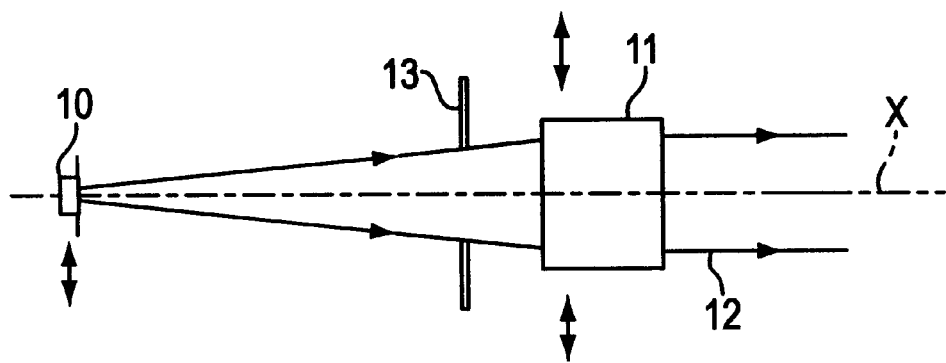
FIG. 3 illustrates how the image position changes as a result of de-centering of the light source away from the optical axis.
Figure 4:
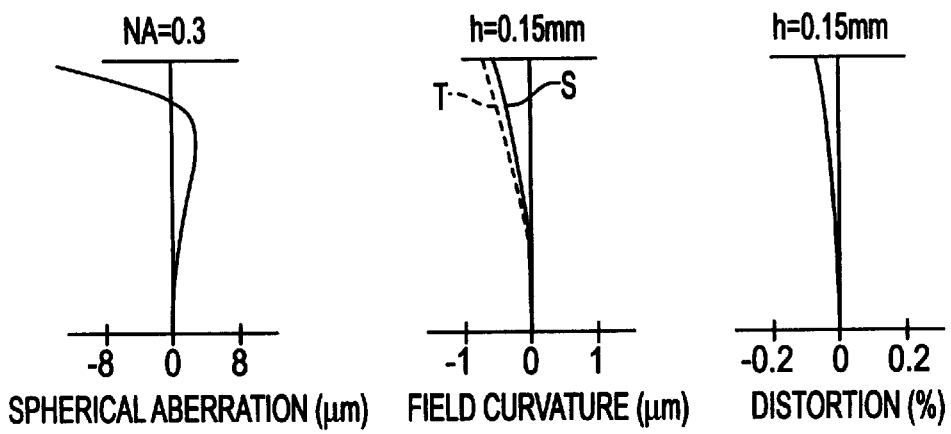
FIG. 4 shows the spherical aberration, curvature of field, and distortion of the collimator lens of Embodiment 1.
Figure 5:
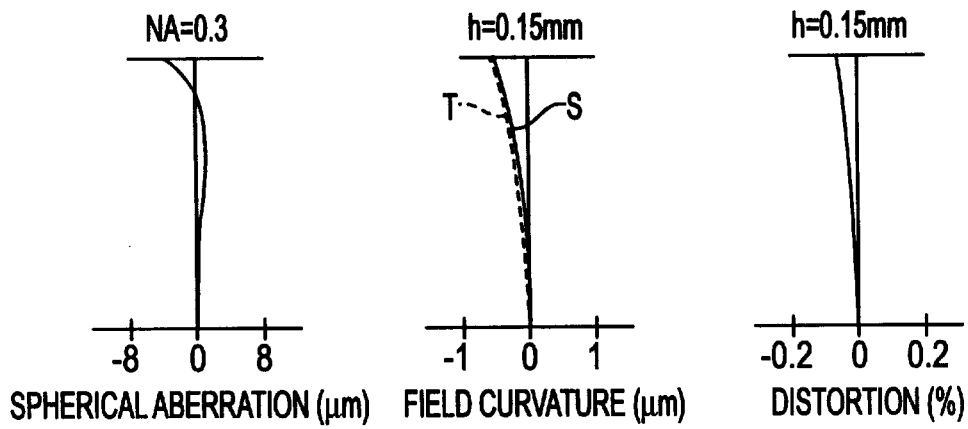
FIG. 5 shows the spherical aberration, curvature of field, and distortion of the collimator lens of Embodiment 2.
Figure 6:
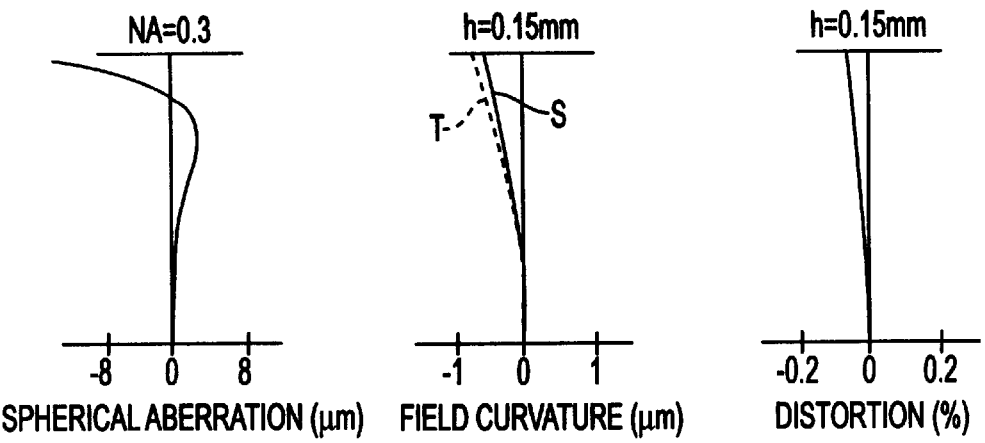
FIG. 6 shows the spherical aberration, curvature of field, and distortion of the collimator lens of Embodiment 3.
Figure 7:
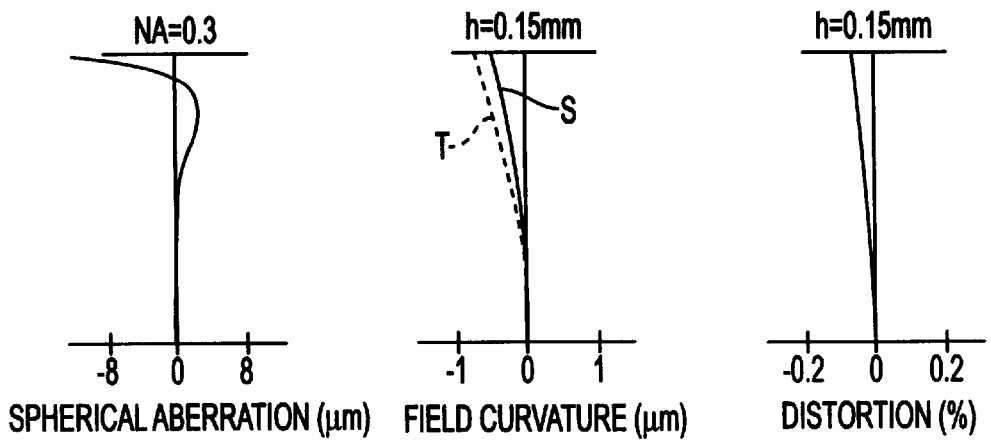
FIG. 7 shows the spherical aberration, curvature of field, and distortion of the collimator lens of Embodiment 4.
Figure 8:
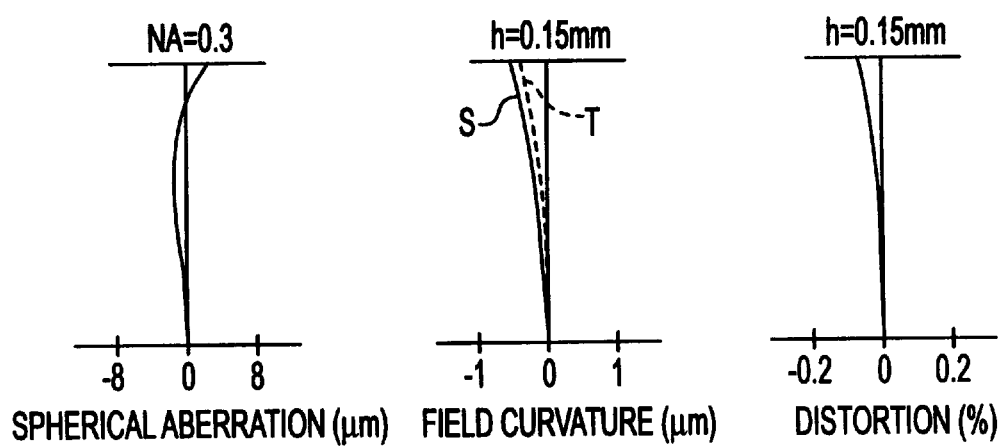
FIG. 8 shows the spherical aberration, curvature of field, and distortion of the collimator lens of Embodiment 5.

As indicated in FIG. 3, as the light source 10 or the collimator lens 11 becomes de-centered from the optical axis X, the collimated luminous flux 12 passing through aperture 13 also becomes de-centered from the optical axis, thereby changing the position of the light incident onto the photosensitive drum 7 (FIG. 2).

As shown in FIG. 1, the collimator lens of the present invention includes, in order from the collimated luminous flux side of the collimator lens, a first lens element $L_1$ composed of a negative meniscus lens element with its concave surface on the collimated luminous flux side, a second lens element $L_2$ composed of a negative meniscus lens element with its convex surface on the collimated luminous flux side, a third lens element $L_3$ composed of a bi-convex lens, a fourth lens element $L_4$ composed of a positive meniscus lens element with its convex surface on the collimated luminous flux side (except for in Embodiments 1, 3, and 4 wherein the fourth lens element $L_4$ is a bi-convex lens), and a fifth lens element $L_5$ composed of a negative meniscus lens element with its concave surface on the collimated luminous flux side (except in Embodiment 5, wherein the fifth lens element $L_5$ is a plano-concave lens). Also there is a diaphragm i, which serves as a stop, that is arranged on the collimated luminous flux side of the first lens element $L_1$. Moreover, in FIG. 1, 8 is a cover glass of the laser diode 3 (FIG. 2), X is the optical axis, and $S_D$ is the air space from the diaphragm surface S to the collimated luminous flux side of the first lens element $L_1$.

Also, the above Conditions (1)–(3) are satisfied. Furthermore, it is preferred that the following conditions be satisfied:

$$1.2 < f_3/f < 1.60 \quad \text{Condition (4)}$$

$$0.80 < f_2/f_1 < 1.20 \quad \text{Condition (5)}$$

where $f_3$ is the focal length of the third lens element, f is as defined above, $f_2$ is the focal length of the second lens element, and $f_1$ is the focal length of the first lens element.

Condition (4) regulates the ratio of the composite focal length f of the collimator lens to the focal length $f_3$ of the third lens element $L_3$. According to Condition (4), when the value of $f_3/f$ is greater than the upper limit, then the amount of positive spherical aberration generated by the third lens element $L_3$ is too great, making correction of the spherical aberration very difficult. On the other hand, if the value of $f_3/f$ is less than the lower limit, then the focal length of the third lens element $L_3$ becomes too small, making the generated amount of negative spherical aberration too small. In other words, by satisfying Condition (4), the spherical aberration and coma can be favorable corrected. Moreover, when satisfying Condition (4), it is preferred that the third lens element $L_3$ be a bi-convex lens.

Condition (5) regulates the ratio of the focal length $f_2$ of the second lens element $L_2$ to the focal length $f_1$ of the first lens element $L_1$. By satisfying Condition (5), the spherical aberration and the curvature of field can be favorably corrected.

In addition, it is preferred that the following conditions are satisfied:

$$0.07 < D_8/f < 0.15 \quad \text{Condition (6)}$$

$$0.75 < f_{34}/f < 0.95 \quad \text{Condition (7)}$$

where, $D_8$ is the lens spacing between the fourth lens element and the fifth lens element, f is as defined above, and $f_{34}$ is the composite focal length of the third lens element and the fourth lens element.

Condition (6) regulates the ratio of the lens spacing $D_8$ (between the fourth lens element $L_4$ and the fifth lens element $L_5$) to the focal length f of the collimator lens. According to Condition (6), when the value of $D_8/f$ exceeds the upper limit, longitudinal spherical aberration and lateral color are not sufficiently corrected. On the other hand, when the value of $D_8/f$ falls below the lower limit, then longitudinal spherical aberration and lateral color are overcorrected. In other words, by satisfying Condition (6), the spherical aberration and longitudinal color can be favorably corrected.

Condition (7) regulates the ratio of the composite focal length $f_{34}$ of the third lens element $L_3$ and the fourth lens element $L_4$ to the focal length f of the collimator. By satisfying Condition (7), the spherical aberration and the field curvature can be favorably corrected while making it possible to obtain a back focus which minimizes heating of the collimator lens by the light source.

Hereinafter, specific Embodiments 1–5 of the invention will be described in detail, with reference to the drawing figures. Each of the numerical data for the collimator lens 1 of Embodiments 1 through 5 are standardized to a 100 mm focal length. An actual collimator lens may be readily scaled to use optimal values according to a desired focal length and resolution.

Embodiment 1

Table 1 shows the surface number #, in order from the side of the collimated luminous flux, the radius of curvature R (in mm) of each lens element surface, the on-axis surface spacing D (in mm), as well as the index of refraction N (at $\lambda$=830 nm) and the Abbe number $v_d$ for the d-line (587.56 nm) of each lens element of Embodiment 1.

In addition, standard wavelength used, the focal length f of the collimator lens, the back focus Bf', the numerical aperture, the cover glass thickness, N of the cover glass, and $v_d$ of the cover glass are indicated in the middle portion of Table 1

In addition, in the lower part of Table 1, the numerical values that correspond to Conditions (1) through (7) of this embodiment are indicated.

TABLE 1

| # | R | D | N | $v_d$ |
|---|---|---|---|---|
| S | ∞ | 6.65 | | |
| 1 | −74.11 | 28.75 | 1.539 | 45.8 |
| 2 | −140.86 | 11.02 | | |
| 3 | 245.86 | 8.31 | 1.539 | 45.8 |
| 4 | 104.51 | 39.51 | | |
| 5 | 162.53 | 45.48 | 1.610 | 63.3 |
| 6 | −133.61 | 8.19 | | |
| 7 | 110.38 | 27.02 | 1.610 | 63.3 |
| 8 | −3525.89 | 8.42 | | |
| 9 | −155.09 | 8.03 | 1.539 | 45.8 |
| 10 | −3630.59 | | | | standard wavelength used = 830 nm
f = 100 mm   Bf' = 101.7 mm   Numerical Aperture = 0.3
cover glass thickness = 5.0 mm   N of cover glass = 1.510
$v_d$ of cover glass = 64.2
Conditions

| (1) | $f_{345}/f = 0.925$ |
|---|---|
| (2) | $R_1/f = -0.741$ |
| (3) | $f_4/f = 1.759$ |
| (4) | $f_3/f = 1.276$ |
| (5) | $f_2/f_1 = 1.008$ |
| (6) | $D_8/f = 0.084$ |
| (7) | $f_{34}/f = 0.798$ |

As is evident from the above table, all of Conditions (1) through (7) are satisfied in Embodiment 1. Further, the back focus is sufficient so as to isolate the heat from the light source from having an effect on the collimator lens performance.

Embodiment 2

Table 2 shows the surface number #, in order from the side of the collimated luminous flux, the radius of curvature R (in mm) of each lens element surface, the on-axis surface spacing D (in mm), as well as the index of refraction N (at $\lambda$=632.8 nm) and the Abbe number $v_d$ for the d-line (587.56 nm) of each lens element of Embodiment 2.

In addition, the standard wavelength used, the focal length f of the collimator lens, the back focus Bf', the numerical aperture, the cover glass thickness, N of the cover glass, and $v_d$ of the cover glass are indicated in the middle portion of Table 2.

In addition, in the lower part of Table 2, the numerical values that correspond to Conditions (1) through (7) for this embodiment are indicated.

TABLE 2

| # | R | D | N | $v_d$ |
|---|---|---|---|---|
| S | ∞ | 5.56 | | |
| 1 | −76.54 | 25.95 | 1.546 | 45.8 |
| 2 | −127.69 | 14.83 | | |
| 3 | 212.35 | 12.47 | 1.546 | 45.8 |
| 4 | 106.35 | 39.59 | | |
| 5 | 158.44 | 49.53 | 1.616 | 63.3 |
| 6 | −158.44 | 13.65 | | |
| 7 | 103.37 | 44.31 | 1.616 | 63.3 |
| 8 | 18244.38 | 8.93 | | |
| 9 | −150.51 | 11.96 | 1.546 | 45.8 |
| 10 | −9838.72 | | | | standard wavelength used = 632.8 nm
f = 100 mm   Bf' = 73.15 mm   Numerical Aperture = 0.3
cover glass thickness = 14.4 mm   N of cover glass 1.515
$v_d$ of cover glass = 64.2
Conditions

| (1) | $f_{345}/f = 0.934$ |
|---|---|
| (2) | $R_1/f = -0.765$ |
| (3) | $f_4/f = 1.682$ |
| (4) | $f_3/f = 1.367$ |
| (5) | $f_2/f_1 = 0.955$ |
| (6) | $D_8/f = 0.089$ |
| (7) | $f_{34}/f = 0.837$ |

As is evident from the above table, all of Conditions (1) through (7) are satisfied in Embodiment 2. Further, the back focus is sufficient so as to isolate the heat from the light source from having an effect on the collimator lens performance.

Embodiment 3

Table 3 shows the surface number #, in order from the side of the collimated luminous flux, the radius of curvature R (in mm) of each lens element surface, the on-axis surface spacing D (in mm), as well as the index of refraction N (at $\lambda$=830 nm) and the Abbe number $v_d$ for the d-line (587.56 nm) of each lens element of Embodiment 3.

In addition, standard wavelength used, the focal length f of the collimator lens, the back focus Bf', the numerical aperture, the cover glass thickness, N of the cover glass, and $v_d$ of the cover glass are indicated in the middle portion of Table 3.

In addition, in the lower part of Table 3, the numerical values that correspond to Conditions (1) through (7) for this embodiment are indicated.

TABLE 3

| # | R | D | N | $v_d$ |
|---|---|---|---|---|
| S | ∞ | 6.38 | | |
| 1 | −73.87 | 29.68 | 1.539 | 45.8 |

TABLE 3-continued

| # | R | D | N | $v_d$ |
|---|---|---|---|---|
| 2 | −146.32 | 10.11 | | |
| 3 | 258.25 | 6.82 | 1.539 | 45.8 |
| 4 | 105.04 | 39.49 | | |
| 5 | 167.74 | 44.69 | 1.610 | 63.3 |
| 6 | −128.17 | 6.67 | | |
| 7 | 114.39 | 21.4 | 1.610 | 63.3 |
| 8 | −2088.16 | 7.67 | | |
| 9 | −160.78 | 6.67 | 1.539 | 45.8 |
| 10 | −2594.99 | | | | standard wavelength used = 830 nm
f = 100 mm   Bf' = 111.75 mm   Numerical Aperture = 0.3
cover glass thickness = 5.0 mm   N of cover glass = 1.510
$v_d$ of cover glass = 64.2
Conditions

| (1) | $f_{345}/f = 0.9271$ |
| (2) | $R_1/f = -0.7387$ |
| (3) | $f_4/f = 1.7837$ |
| (4) | $f_3/f = 1.2628$ |
| (5) | $f_2/f_1 = 1.0324$ |
| (6) | $D_g/f = 0.0767$ |
| (7) | $f_{34}/f = 0.7916$ |

As is evident from the above table, all of Conditions (1) through (7) are satisfied in Embodiment 3. Further, the back focus is sufficient so as to isolate the heat from the light source from having an effect on the collimator lens performance.

Embodiment 4

Table 4 shows the surface number #, in order from the side of the collimated luminous flux, the radius of curvature R (in mm) of each lens element surface, the on-axis surface spacing D (in mm), as well as the index of refraction N (at λ=830 nm) and the Abbe number $v_d$ for the d-line (587.56 nm) of each lens element of Embodiment 4.

In addition, the standard wavelength used, the focal length f of the collimator lens, the back focus Bf', the numerical aperture, the cover glass thickness, N of the cover glass, and $v_d$ of the cover glass are indicated in the middle portion of Table 4

In addition, in the lower part of Table 4, the numerical values that correspond to Conditions (1) through (7) for this embodiment are indicated.

TABLE 4

| # | R | D | N | $v_d$ |
|---|---|---|---|---|
| S | ∞ | 6.57 | | |
| 1 | −71.97 | 32.97 | 1.539 | 45.8 |
| 2 | −162.53 | 6.67 | | |
| 3 | 306.64 | 6.67 | 1.539 | 45.8 |
| 4 | 102.27 | 38.68 | | |
| 5 | 195.18 | 41.29 | 1.610 | 63.3 |
| 6 | −118.88 | 7.08 | | |
| 7 | 118.76 | 25.03 | 1.610 | 63.3 |
| 8 | −1100.81 | 7.27 | | |
| 9 | −167.13 | 6.67 | 1.539 | 45.8 |
| 10 | −1542.34 | | | | standard wavelength used = 830 nm
f = 100 mm   Bf' = 120.09 mm   Numerical Aperture = 0.3
cover glass thickness = 5.0 mm   N of cover glass = 1.510
$v_d$ of cover glass = 64.2
Conditions

| (1) | $f_{345}/f = 0.9111$ |
| (2) | $R_1/f = -0.7197$ |
| (3) | $f_4/f = 1.7703$ |
| (4) | $f_3/f = 1.2741$ |
| (5) | $f_2/f_1 = 1.0485$ |

TABLE 4-continued

| # | R | D | N | $v_d$ |
|---|---|---|---|---|
| (6) | | $D_g/f = 0.0727$ | | |
| (7) | | $f_{34}/f = 0.7897$ | | |

As is evident from the above table, all of Conditions (1) through (7) are satisfied in Embodiment 4. Further, the back focus is sufficient so as to isolate the heat from the light source from having an effect on the collimator lens performance.

Embodiment 5

Table 5 shows the surface number #, in order from the side of the collimated luminous flux, the radius of curvature R (in mm) of each lens element surface, the on-axis surface spacing D (in mm), as well as the index of refraction N (at λ=830 nm) and the Abbe number $v_d$ for the d-line (587.56 nm) of each lens element of Embodiment 5.

In addition, standard wavelength used, the focal length f of the collimator lens, the back focus Bf', the numerical aperture, the cover glass thickness, N of the cover glass, and $v_d$ of the cover glass are indicated in the middle portion of Table 5.

In addition, in the lower part of Table 5, the numerical values that correspond to Conditions (1) through (7) for this embodiment are indicated.

TABLE 5

| # | R | D | N | $v_d$ |
|---|---|---|---|---|
| S | ∞ | 7.31 | | |
| 1 | −77.74 | 27.45 | 1.539 | 45.8 |
| 2 | −117.21 | 15.99 | | |
| 3 | 186.48 | 14.50 | 1.539 | 45.8 |
| 4 | 107.08 | 36.84 | | |
| 5 | 161.03 | 50.87 | 1.610 | 63.3 |
| 6 | −190.12 | 21.39 | | |
| 7 | 96.68 | 55.49 | 1.610 | 63.3 |
| 8 | 90867.37 | 14.41 | | |
| 9 | −143.43 | 28.77 | 1.539 | 45.8 |
| 10 | ∞ | | | | standard wavelength used = 830 nm
f = 100 mm   Bf' = 38.51 mm   Numerical Aperture = 0.3
cover glass thickness = 5.0 mm   N of cover glass = 1.510
$v_d$ of cover glass = 64.2
Conditions

| (1) | $f_{345}/f = 0.9459$ |
| (2) | $R_1/f = -0.7774$ |
| (3) | $f_4/f = 1.5855$ |
| (4) | $f_3/f = 1.5116$ |
| (5) | $f_2/f_1 = 0.8804$ |
| (6) | $D_g/f = 0.1441$ |
| (7) | $f_{34}/f = 0.8868$ |

As is evident from the above table, all of Conditions (1) through (7) are satisfied in Embodiment 5. Further, the back focus is sufficient so as to isolate the heat from the light source from having an effect on the collimator lens performance.

In addition, the spherical aberration, curvature of field and distortion occurring in each of the Embodiments 1 through 5 are shown in FIGS. 4 through 8, respectively. Moreover, "NA" in these Figs. indicates the numerical aperture, and "h" indicates the image height. Further, in each figure the curvature of field of both the sagittal (S) image and the tangential (T) image are shown.

As is evident from FIGS. 4 through 8, for each of the embodiments described above, it is possible to make favorable all of the aberrations described above.

Also, the collimator lens of the present invention is made so as to correct the field curvature of the lens by placing the stop near the focal position so as to reduce aberrations that occur due to the slippage in the optical axis direction or due to de-centering of the light source or the collimator lens. The stop makes the luminous flux entering from the light source side to be nearly telecentric. By this, a plurality of laser diodes that act as the light source can be arranged on a flat surface perpendicular to the optical axis, thereby making possible the utilization of multi-beams. For example, in a color copying machine, it is possible to arrange on a flat surface perpendicular to the optical axis four laser diodes by the addition of 3 laser diodes corresponding to red, green and blue, respectively, as well as one for monochrome use. Further, by arranging a plurality of laser diodes for monochrome use in the sub-scanning direction, the number of scanning times can be reduced thereby shortening the optical scanning time.

In addition, the collimator lens of the present invention can even be used as an objective lens for the purpose of scanning and also collecting laser beams at the position of image formation by forming the image of an object that is placed on what is normally the collimated luminous flux side of the lens.

According to the collimator lens of the present invention, it is possible to achieve a bright image having small aberrations and curvature of field while reducing lens aberrations resulting from heat due to the light source. This is achieved by arranging a diaphragm on the collimated luminous flux side of the collimator lens and by using a five lens element composition for the collimator lens, as described above. In addition, by satisfying Conditions (1), (2) and (3) described above, it is possible to achieve the effects described below.

By satisfying Condition (1), it becomes possible for the spherical aberrations to be corrected more favorably while being able to obtain the desired back focus that further inhibits the effect of heat from the light source.

Further, by satisfying Condition (2), it becomes possible for the spherical aberrations to be corrected more favorably while further constraining generation of curvature of field.

Moreover, by satisfying Condition (3), it becomes possible for the spherical aberrations and the coma to be corrected more favorably.

The invention being thus described, it will be obvious that the same may be varied in many ways. For example, the curvature radius R of each lens element as well as the lens spacing D between the surfaces, the stop diaphragm surface S and the distance to the first lens may be readily scaled to obtain a collimator lens of a desired focal length and resolution. Such variations are not to be regarded as a departure from the spirit and scope of the invention. Rather the scope of the invention shall defined as set forth in the following claims and their legal equivalents. All such modifications as would be obvious to one skilled in the art are intended to be included within the scope of the following claims.

What is claimed is:

1. A collimator lens comprising, in order from a collimated luminous flux side of the collimator lens:

a first lens element of negative refractive power, a second lens element of negative refractive power, a third lens element of positive refractive power, a fourth lens element of positive refractive power, a fifth lens element of negative refractive power, and a diaphragm arranged on the collimated luminous flux side of said first lens element.

2. The collimator lens of claim 1, wherein said first lens element has a meniscus shape with its concave surface on the collimated luminous flux side.

3. The collimator lens of claim 2, wherein the fourth lens element has a convex surface on the collimated luminous flux side.

4. The collimator of claim 3, wherein the fifth lens element has a concave surface on the collimated luminous flux side.

5. The collimator lens according to claim 1, and further satisfying the following condition $$0.90 < f_{345}/f < 0.95$$

where $f_{345}$ is the composite focal length of the third lens element through the fifth lens element, and f is the focal length of the collimator lens.

6. The collimator lens according to claim 5, said collimator lens further satisfying the following conditions:

$$-0.79 < R_1/f < -0.70$$

$$1.10 < f_4/f < 1.94$$

where $R_1$ is the radius of curvature on the collimated luminous flux side of the first lens element, f is the focal length of the collimator lens, and $f_4$ is the focal length of the fourth lens element.

7. The collimator lens according to claim 6, said collimator lens further satisfying the following conditions:

$$1.2 < f_3/f < 1.60$$

$$0.80 < f_2/f_1 < 1.2$$

where $f_3$ is the focal length of the third lens element, f is the focal length of the collimator lens, $f_2$ is the focal length of the second lens element, and $f_1$ is the focal length of the first lens element.

8. The collimator lens according to claim 1, said collimator lens further satisfying the following conditions:

$$-0.79 < R_1/f < -0.70$$

$$1.10 < f_4/f < 1.94$$

where $R_1$ is the radius of curvature on the collimated luminous flux side of the first lens element, f is the focal length of the collimator lens, and $f_4$ is the focal length of the fourth lens element.

9. The collimator lens as set forth in claim 1, said collimator lens further having the following construction:

| # | R | D | N | $v_d$ |
|---|---|---|---|---|
| S | ∞ | 6.65 | | |
| 1 | −74.11 | 28.75 | 1.539 | 45.8 |
| 2 | −140.86 | 11.02 | | |
| 3 | 245.86 | 8.31 | 1.539 | 45.8 |
| 4 | 104.51 | 39.51 | | |
| 5 | 162.53 | 45.48 | 1.610 | 63.3 |
| 6 | −133.61 | 8.19 | | |
| 7 | 110.38 | 27.02 | 1.610 | 63.3 |
| 8 | −3525.89 | 8.42 | | |
| 9 | −155.09 | 8.03 | 1.539 | 45.8 |
| 10 | −3630.59 | | | | where S is a stop, # is the surface number in order from the side of the collimated luminous flux, R is the radius of curvature in mm of each lens element surface, D is the on-axis surface spacing in mm, N is the index of refraction at λ=830 nm, and $v_d$ is the Abbe number for the d-line of each lens element.

10. The collimator lens as set forth in claim 1, said collimator lens further having the following construction:

| # | R | D | N | $v_d$ |
|---|---|---|---|---|
| S | ∞ | 5.56 | | |
| 1 | −76.54 | 25.95 | 1.546 | 45.8 |
| 2 | −127.69 | 14.83 | | |
| 3 | 212.35 | 12.47 | 1.546 | 45.8 |
| 4 | 106.35 | 39.59 | | |
| 5 | 158.44 | 49.53 | 1.616 | 63.3 |
| 6 | −158.44 | 13.65 | | |
| 7 | 103.37 | 44.31 | 1.616 | 63.3 |
| 8 | 18244.38 | 8.93 | | |
| 9 | −150.51 | 11.96 | 1.546 | 45.8 |
| 10 | −9838.72 | | | | where S is a stop, # is the surface number in order from the side of the collimated luminous flux, R is the radius of curvature in mm of each lens element surface, D is the on-axis surface spacing in mm, N is the index of refraction at λ=632.8 nm, and $v_d$ is the Abbe number for the d-line of each lens element.

11. The collimator lens as set forth in claim 1, said collimator lens further having the following construction:

| # | R | D | N | $v_d$ |
|---|---|---|---|---|
| S | ∞ | 6.38 | | |
| 1 | −73.87 | 29.68 | 1.539 | 45.8 |
| 2 | −146.32 | 10.11 | | |
| 3 | 258.25 | 6.82 | 1.539 | 45.8 |
| 4 | 105.04 | 39.49 | | |
| 5 | 167.74 | 44.69 | 1.610 | 63.3 |
| 6 | −128.17 | 6.67 | | |
| 7 | 114.39 | 21.4 | 1.610 | 63.3 |
| 8 | −2088.16 | 7.67 | | |
| 9 | −160.78 | 6.67 | 1.539 | 45.8 |
| 10 | −2594.99 | | | | where S is a stop, # is the surface number in order from the side of the collimated luminous flux, R is the radius of curvature in mm of each lens element surface, D is the on-axis surface spacing in mm, N is the index of refraction at λ=830 nm, and $v_d$ is the Abbe number for the d-line of each lens element.

12. The collimator lens as set forth in claim 1, said collimator lens further having the following construction:

| # | R | D | N | $v_d$ |
|---|---|---|---|---|
| S | ∞ | 6.57 | | |
| 1 | −71.97 | 32.97 | 1.539 | 45.8 |
| 2 | −162.53 | 6.67 | | |
| 3 | 306.64 | 6.67 | 1.539 | 45.8 |
| 4 | 102.27 | 38.68 | | |
| 5 | 195.18 | 41.29 | 1.610 | 63.3 |
| 6 | −118.88 | 7.08 | | |
| 7 | 118.76 | 25.03 | 1.610 | 63.3 |
| 8 | −1100.81 | 7.27 | | |
| 9 | −167.13 | 6.67 | 1.539 | 45.8 |
| 10 | −1542.34 | | | | where S is a stop, # is the surface number in order from the side of the collimated luminous flux, R is the radius of curvature in mm of each lens element surface, D is the on-axis surface spacing in mm, N is the index of refraction at λ=830 nm, and $v_d$ is the Abbe number for the d-line of each lens element.

13. The collimator lens as set forth in claim 1, said collimator lens further having the following construction:

| # | R | D | N | $v_d$ |
|---|---|---|---|---|
| S | ∞ | 7.31 | | |
| 1 | −77.74 | 27.45 | 1.539 | 45.8 |
| 2 | −117.21 | 15.99 | | |
| 3 | 186.48 | 14.50 | 1.539 | 45.8 |
| 4 | 107.08 | 36.84 | | |
| 5 | 161.03 | 50.87 | 1.610 | 63.3 |
| 6 | −190.12 | 21.39 | | |
| 7 | 96.68 | 55.49 | 1.610 | 63.3 |
| 8 | 90867.37 | 14.41 | | |
| 9 | −143.43 | 28.77 | 1.539 | 45.8 |
| 10 | ∞ | | | | where S is a stop, # is the surface number in order from the side of the collimated luminous flux, R is the radius of curvature in mm of each lens element surface, D is the on-axis surface spacing in mm, N is the index of refraction at λ=830 nm, and $v_d$ is the Abbe number for the d-line of each lens element.

14. In an optical scanner, the improvement of a collimator lens as set forth in claim 1.

15. In an optical scanner, the improvement of a collimator lens as set forth in claim 2.

16. In an optical scanner, the improvement of a collimator lens as set forth in claim 3.

17. In an optical scanner, the improvement of a collimator lens as set forth in claim 4.

18. In an optical scanner, the improvement of a collimator lens as set forth in claim 5.

19. In an optical scanner, the improvement of a collimator lens as set forth in claim 6.

20. In an optical scanner, the improvement of a collimator lens as set forth in claim 7.

* * * * *

UNITED STATES PATENT AND TRADEMARK OFFICE
CERTIFICATE OF CORRECTION

PATENT NO. : 6,014,262
DATED : Jan. 11, 2000
INVENTOR(S) : Noda

It is certified that error appears in the above-identified patent and that said Letters Patent is hereby corrected as shown below:

Title page, following "Filed: Dec. 8, 1998", insert:

-- [30] Foreign Application Priority Data

Japan 10-015013 January 9, 1998
Japan 10-337028 November 27, 1998

Signed and Sealed this

First Day of August, 2000

*Attest:*

Q. TODD DICKINSON

*Attesting Officer*   Director of Patents and Trademarks